United States Patent

Yazuka et al.

[11] Patent Number: 4,658,405
[45] Date of Patent: Apr. 14, 1987

[54] RADIO COMMUNICATION SYSTEM

[75] Inventors: Hiroyuki Yazuka, Kawasaki; Isao Nakazawa, Isehara, both of Japan

[73] Assignee: Fujitsu Limited, Kawasaki, Japan

[21] Appl. No.: 569,772

[22] Filed: Jan. 10, 1984

[30] Foreign Application Priority Data

Jan. 21, 1983 [JP] Japan ................................ 58-007448

[51] Int. Cl.⁴ ............................................... H04B 7/00
[52] U.S. Cl. ........................................ 375/38; 375/39; 455/60; 342/361
[58] Field of Search ...................... 343/361; 370/2, 20; 455/59, 60, 616, 102, 103, 105, 138; 375/17, 38, 39

[56] References Cited

U.S. PATENT DOCUMENTS

| | | | |
|---|---|---|---|
| 2,288,802 | 7/1942 | Hammond, Jr. ..................... | 343/361 |
| 2,992,427 | 7/1961 | Franco . | |
| 3,111,668 | 11/1963 | Kuecken ............................ | 343/361 |
| 3,531,951 | 11/1950 | Shamos et al. ..................... | 343/361 |
| 3,760,274 | 9/1973 | Vogt .................................... | 455/60 |
| 3,835,392 | 9/1974 | Mahner et al. ..................... | 455/138 |
| 3,934,204 | 1/1976 | Hill ..................................... | 455/138 |
| 3,971,930 | 7/1976 | Fitzmaurice et al. ............... | 455/616 |
| 4,084,137 | 4/1978 | Welti .................................. | 343/361 |
| 4,521,878 | 6/1985 | Toyonaga et al. ................... | 455/60 |

OTHER PUBLICATIONS

"A Coherent Digital Amplitude and Phase Modulation Scheme", IRE Transactions on Communications Systems, Mar. 1962, pp. 90-95.

European Search Report, The Hague, Aug. 30, 1985, Examiner: Holper.

Primary Examiner—Benedict V. Safourek
Attorney, Agent, or Firm—Staas & Halsey

[57] ABSTRACT

A radio communication system includes a transmitter unit, a transmission line and a receiver unit. The transmitter unit produces a vertically-polarized wave carrier or a horizontally-polarized wave carrier or both, in accordance with transmission data to be transmitted to the receiver unit. The receiver unit discriminates the levels of the thus transmitted vertically- and horizontally-polarized wave carriers to reproduce the original data.

25 Claims, 25 Drawing Figures

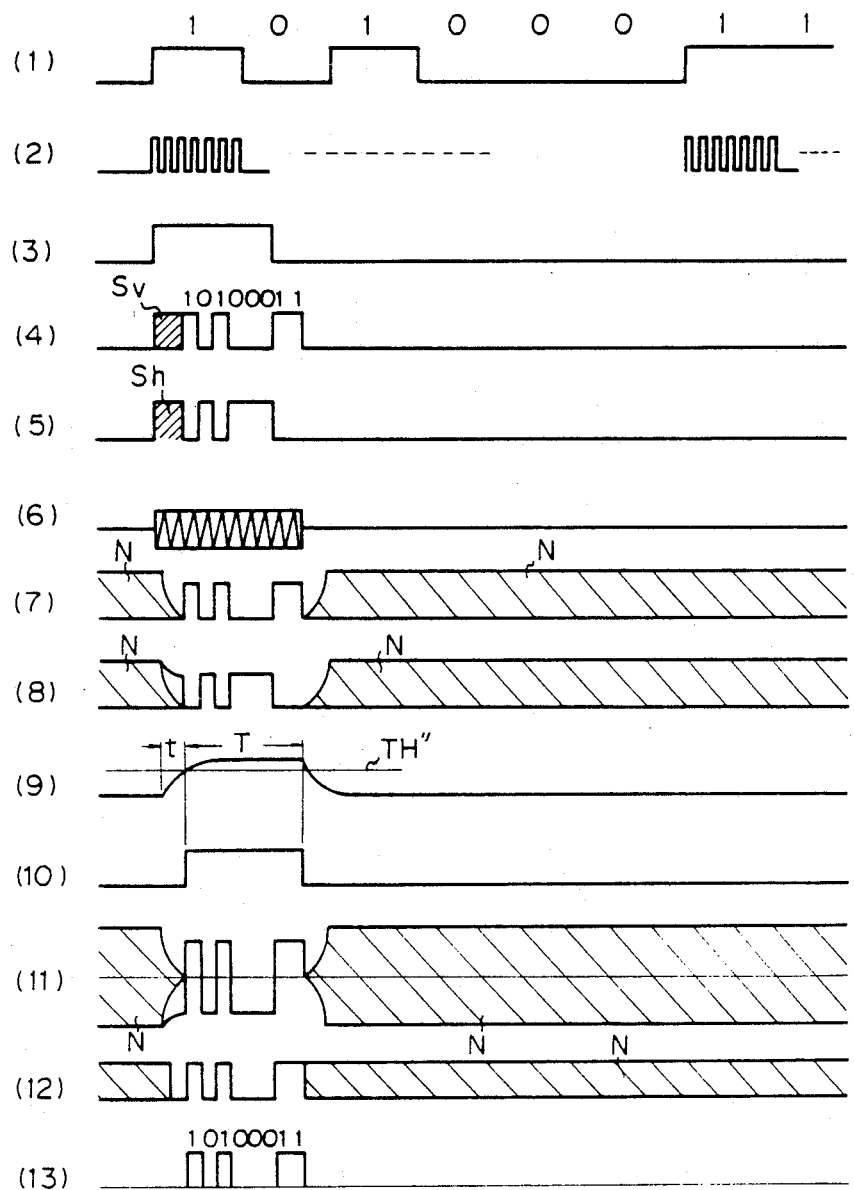

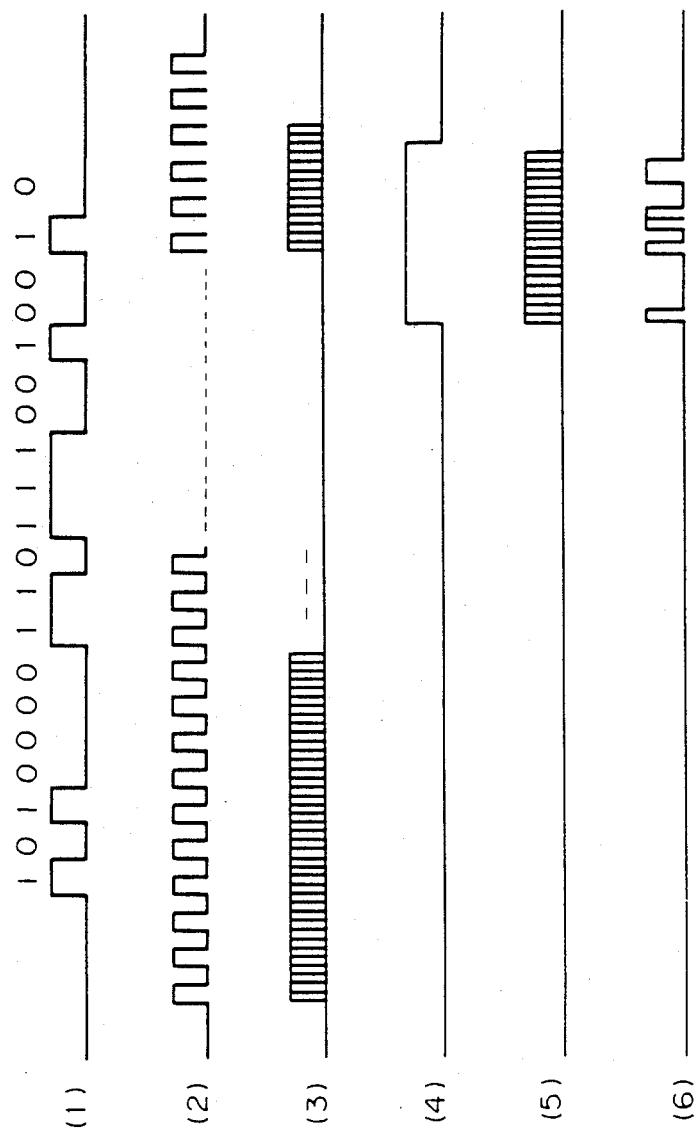

RADIO COMMUNICATION SYSTEM

BACKGROUND OF THE INVENTION

1. Field of the Invention

The present invention relates to a radio communication system operated under a digital modulation method, in which a carrier is amplitude modulated according to data to be transmitted.

2. Description of the Prior Art

In a radio communication system for transmitting digital data, a carrier is digitally modulated by data to be transmitted. A variety of methods have been proposed and put into practice for this purpose, for example, the phase shift keying (PSK) modulation method, frequency shift keying (FSK) modulation method, and amplitude shift keying (ASK) modulation method.

In the on-off keying type ASK modulation method, the carrier is transmitted or not transmitted in accordance with data of logic "1" or "0", respectively. This method therefore has an advantage in the extreme ease of its processing operation for transmitting and receiving data. The on-off keying type ASK modulation method has, however, suffered from several problems. First, because the carrier is transmitted or not transmitted during data transmission, the data error rate is higher than that of other modulation methods. Second, it is not easy to distinguish the condition where a carrier is not generated due to, for example, a pause in the system operation from the condition where a carrier is not transmitted due to the transmission of data of logic "0". This makes it difficult to employ the on-off keying type ASK modulation method in a system operated under, for example, a time division multiple access (TDMA) method, in which burst-like data transmission is performed. In the TDMA method, it is not easy to distinguish the condition of burst-like data transmission of logic "0" and the condition of a carrier pause. Third, an automatic gain control (AGC) operation is usually essential in a data transmitting and receiving system for stabilizing the received signal level. In on-off keying type ASK modulation it is not possible to perform an AGC operation when the receiving signal represents logic "0". Further, it is impossible to establish an optimum AGC operation instantaneously for a received signal representing logic "1" i.e., the carrier, appearing immediately after a signal of logic "0", because no meaningful AGC is established for the preceding signal of logic "0".

SUMMARY OF THE INVENTION

It is an object of the present invention to provide a radio communication system which can overcome all three of the above problems.

The above object is basically attained by the following. The transmitter unit of the system modulates the carrier according to data of logic "1" and "0" and transmits the thus modulated transmission signal using a vertically (V)-polarized wave or a horizontally (H)-polarized wave. The receiver unit receives the V- or H-polarized waves and demodulates the original data therewith.

BRIEF DESCRIPTION OF THE DRAWINGS

The present invention will be more apparent from the ensuing description with reference to the accompanying drawings, wherein:

FIG. 10C depicts waveforms of major signals appearing in the transmitter unit of FIG. 10A and the receiver unit of FIG. 10B for explaining the operations thereof;

FIG. 10E depicts waveforms of major signals appearing in the circuit of FIG. 10D;

DESCRIPTION OF THE PREFERRED EMBODIMENTS

Figure 1A:
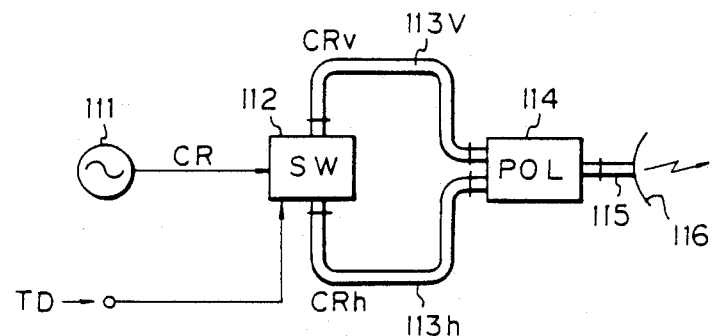
FIG. 1A illustrates a transmitter unit of a radio communication system according to a first embodiment of the present invention.

FIG. 1A illustrates a transmitter unit of a radio communication system according to a first embodiment of the present invention. It should be noted that the following descriptions with reference to FIGS. 1A through 10E are made for a system operated under the on-off keying type ASK modulation method.

In FIG. 1A, reference numeral 111 represents an oscillator for producing a carrier CR. The carrier CR is transformed into a V-polarized wave $CR_v$ or an H-polarized wave $CR_h$ by means of a polarized wave switching selector (SW) 112. Which of the V- and H-polarized waves is to be selected is determined in accordance with the transmission data TD having values of logic "0" or "1". If the V-polarized wave is assigned, in advance, to the logic "1", a carrier $CR_v$ with the V-polarized wave is switched to a waveguide $113_v$ when logic "1" appears, while a carrier $CR_h$ with the H-polarized wave, is switched to a waveguide $113_h$ when logic "0" appears. The carriers $CR_v$ and $CR_h$ are transferred to a polarizer (POL) 114, further supplied to a waveguide 115, and then radiated from a common V H-polarized wave antenna 116. The waveguides $113_v$, $113_h$ and 115 may be rectangular waveguides or circular waveguides. Since the antenna 116 radiates the V-polarized wave and also the H-polarized wave, a parabolic antenna, a Cassegrain antenna, or the like may be used. The thus radiated carrier $CR_v$ (logic "1") or the carrier $CR_h$ (logic "0") is received at a remote site, via a radio transmission line (not shown).

Figure 1B:
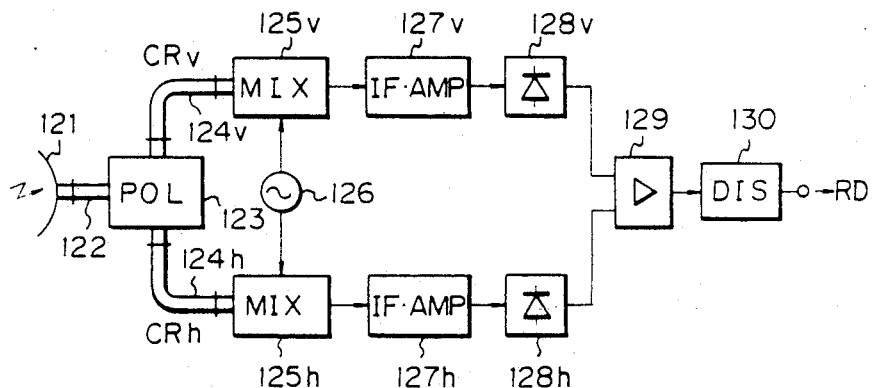
FIG. 1B illustrates a receiver unit of the radio communication system according to the first embodiment of the present invention.

FIG. 1B illustrates a receiver unit of the radio communication system according to the first embodiment of the present invention. The carriers $CR_v$ and $CR_h$ are first received at a common V H-polarized wave antenna 121, then are further transferred, via a waveguide 122, to a polarizer 123. The polarizer 123 provides the carriers $CR_v$ and $CR_h$ to a mixer (MIX) $125_v$ and a mixer (MIX) $125_h$, via waveguides $124_v$ and $124_h$, respectively. The mixers $125_v$ and $125_h$ also receive local oscillation signals commonly supplied from a local oscillator 126 and thereby convert the carriers $CR_v$ and $CR_h$ into individual intermediate frequency (IF) signals. Then, the IF signals are amplified by individual intermediate frequency amplifiers (IF AMP) $127_v$ and $127_h$ and, thereafter, detected by individual detectors $128_v$ and $128_h$. The thus detected signals are input to a differential amplifier 129. The differentially amplified signal is input to a discriminator (DIS) 130 for demodulation and reproduction of the original data as received data RD.

Figure 2A:
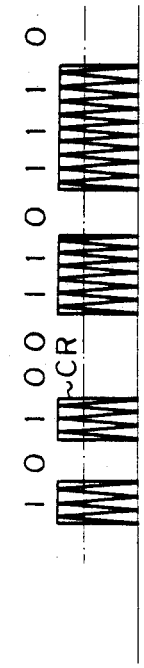
FIG. 2A depicts waveforms of an arbitrary received signal modulated under a conventional on-off keying type ASK modulation method.
Figure 2B:
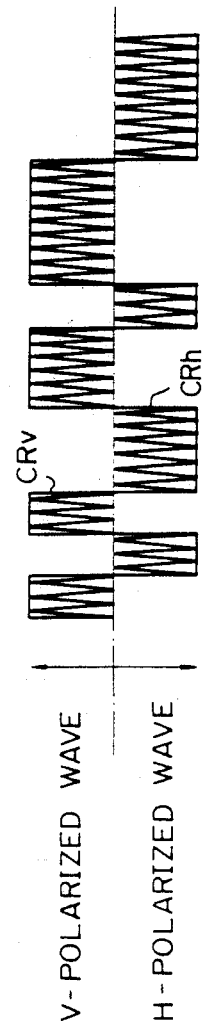
FIG. 2B depicts waveforms of an arbitrary received signal modulated under an on-off keying type ASK modulation method according to the present invention.

FIG. 2A depicts waveforms of an arbitrary received signal modulated under a conventional on-off keying type ASK modulation method. FIG. 2B depicts waveforms of an arbitrary received signal modulated under an on-off keying type ASK modulation method according to the present invention. Both waveforms are depicted for the data pattern of "10100..." as an example. In FIGS. 2A and 2B, the chain dotted line indicates a threshold level for distinguishing data "1" and "0" from each other. As is apparent from a comparison of the waveforms in FIG. 2A with those of FIG. 2B, the operating margin of the received signal with respect to the threshold level for distinguishing data "1" and "0" obtained in case of FIG. 2B is much greater than that obtained in the case of FIG. 2A. Therefore, the error rate can be drastically improved. In this case, the error rate can theoretically be improved by about 3 dB.

Referring to FIG. 2A, it is clear that the condition of the received signal representing data of logic "0" is equivalent to the condition of a carrier pause. This makes it difficult to clearly distinguish these two conditions from each other. On the other hand, as apparent from FIG. 2B, the waveforms of the received signal according to the present invention allow easy, clear determination that the received signal represents data of logic "0", i.e., the existence of the carrier $CR_h$ is not the condition where the carrier is paused, i.e., neither the carrier $CR_v$ nor the carrier $CR_h$ exist when a pause occurs.

Referring again to FIG. 2A, it is clear that an AGC operation cannot be adapted to the received signal of data logic "0", since no carrier exists. Contrary to the above, as clear from FIG. 2B, an AGC operation can be continually performed on the received signal, since one of the carriers $CR_v$ and $CR_h$ is always present in the receiver unit when data is being received.

Figure 3:
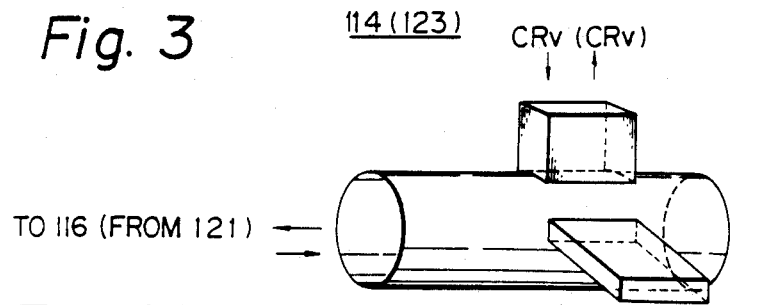
FIG. 3 is a perspective view of an example of the polarizer in FIGS. 1A and 1B.

Detailed examples of major elements of the circuits of FIGS. 1A and 1B will now be given. FIG. 3 is a perspective view of an example of a polarizer 114 (123) in FIG. 1A (FIG. 1B). In FIG. 3, reference numerals and characters in parentheses represent elements of the receiver unit in FIG. 18. Incidentally, the circular waveguide illustrated is short-circuited at its right side end.

Figure 4A:
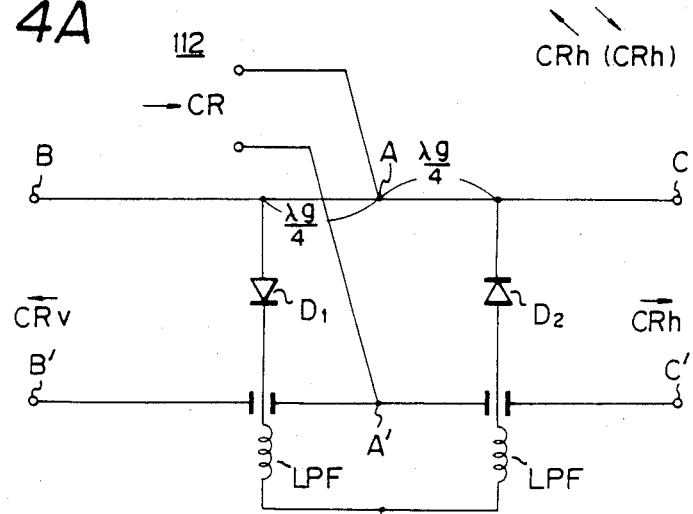
FIG. 4A is a circuit diagram of an example of the polarized wave switching selector in FIG. 1A.
Figure 4B:
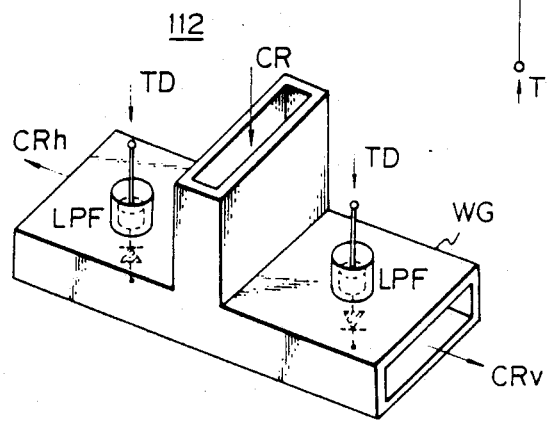
FIG. 4B is a perspective view of an example of a structure based on the circuit in FIG. 4A.

FIG. 4A is a circuit diagram of an example of the polarized wave switching selector 112 in FIG. 1A. In FIG. 4A, reference characters $D_1$ and $D_2$ represent pin diodes located $(\lambda g)/4$ apart from points A and A', respectively. The pin diodes $D_1$ and $D_2$ receive the same transmission data TD, but via individual low-pass filters LPF's. Thus, the diodes $D_1$ and $D_2$ are inversely short-circuited and opened, and vice versa, in accordance with the content (polarity) of the transmission data TD. Accordingly, the carrier CR of the oscillator 111 (FIG. 1A) is selectively radiated from either an output terminal B—B' or an output terminal C—C' according to the polarity of the transmission data TD. FIG. 4B is a perspective view of the circuit in FIG. 4A. In this example, the waveguide WG is constructed as a so-called T-shaped branch type.

Figure 5A:
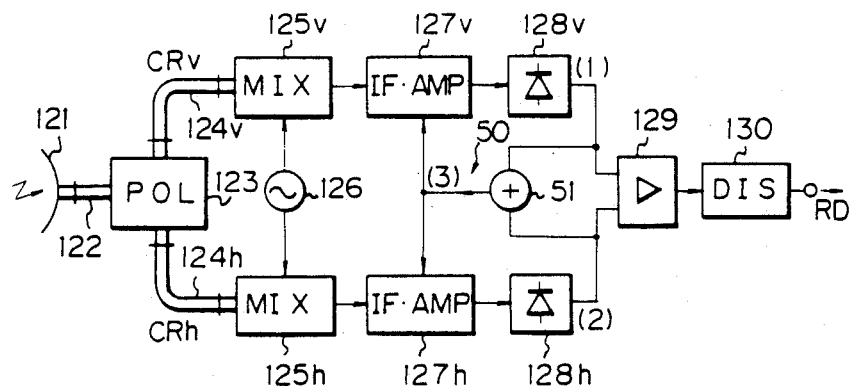
FIG. 5A illustrates a receiver unit provided with an AGC circuit preferably employed in the system of the present invention.
Figure 5B:
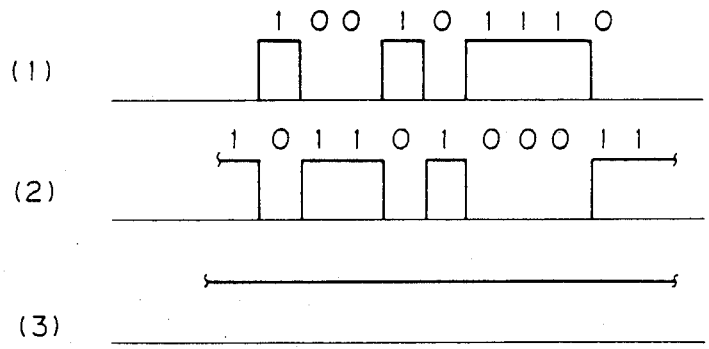
FIG. 5B depicts waveforms of major signals appearing in the receiver unit of FIG. 5A.

In the radio communication system according to the first embodiment of the present invention, as previously mentioned, an AGC operation can be continually achieved for the received signal, since one of the carriers $CR_v$ and $CR_h$ is always present in the receiver unit during data reception. The AGC operation will now be further explained in detail. FIG. 5A illustrates a receiver unit provided with an AGC circuit which is preferably employed in the system of the present invention. FIG. 5B depicts waveforms of major signals appearing in the receiver unit of FIG. 5A. Attention should be paid to the differential amplifier 129 of FIGS. 1B and 5A, which receives both the V- and H-polarized wave signal components. This arrangement can improve the error rate due to the existence of the signal components of one of the carriers $CR_v$ and $CR_h$, as explained before. When such a differential amplification is used, it is not advantageous to perform an AGC operation in the V-polarized wave receiving side and in the H-polarized wave receiving side independently from each other.

That is, it is advantageous to establish a common AGC operation in the receiver unit. Based on the concept of a common AGC operation, a common AGC circuit 50 is preferably used, as illustrated in FIG. 5A. In other words, it can be said that, since the differential amplification method is used, it is advantageous to vary each of the received signal levels, for example, the H-polarized wave received signal, simultaneously with the variation of the other received signal level, i.e., the V-polarized wave received signal level. Therefore, the AGC'ed received signal is obtained with a constant peak-to-peak level as can be seen in the waveforms in FIG. 2B.

In order to attain the above-mentioned AGC, the common AGC circuit 50 of FIG. 5A is primarily comprised of an adder 51. The adder 51 operates to average the received amplitude level of both the V-polarized wave and the H-polarized wave in total. The averaged received amplitude level is fed back, as a common AGC signal, to the IF amplifiers 127$_v$ and 127$_h$, simultaneously. Although FIG. 5A illustrates the case where the received amplitude levels for the AGC are obtained at the outputs of the detectors 128$_v$ and 128$_h$, it is also possible to obtain the levels at the inputs thereof. Major signals appearing at portions (1), (2) and (3) around the common AGC circuit 50 of FIG. 5A are respectively depicted in waveforms in rows (1), (2) and (3) of FIG. 5B, using received data having a logic pattern "1001 . . . " as an example.

Figure 6:
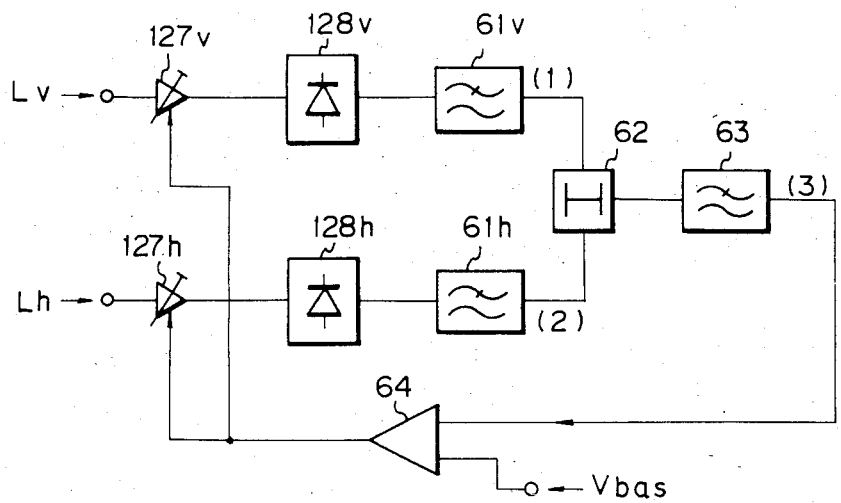
FIG. 6 illustrates a detailed example of a common AGC circuit usable in FIG. 5A, and elements of the receiver connected thereto.

FIG. 6 illustrates a detailed example of the common AGC circuit 50 in FIG. 5A and the elements connected thereto. In FIG. 6, reference numerals 61$_v$, 61$_h$ and 63 represent low-pass filters, 62 a hybrid circuit and a comparator 64. The comparator 64 receives, at its first input, the received amplitude level of both the V- and H-polarized wave signals, added in the hybrid circuit 62 to each other and, at its second input, a bias voltage V$_{bas}$ for setting a reference level for the received amplitude level. Therefore, an AGC voltage signal is produced therefrom and fed back to both the IF amplifiers 127$_v$ and 127$_h$. It will now be described why, as previously mentioned, it is advantageous to establish a common AGC operation in the receiver unit, rather than to perform the AGC operation on the V-polarized wave receiving side and the H-polarized wave receiving side independently. Assuming that reference characters L$_v$ and L$_h$, in FIG. 6, are input levels of the IF amplifiers 127$_v$ and 127$_h$ respectively, to attain AGC, the following equation (1) must hold:

$$\sqrt{L_v G_v} + \sqrt{L_h G_h} = k \quad (1)$$

where the characters G$_v$ and G$_h$ denote the gains of the amplifiers 127$_v$ and 127$_h$, respectively, and k is a constant. G$_v$ and G$_h$ are determined to be equal to each other, i.e., G$_v$=G$_h$. Therefore, equation (1) can be rewritten as follows:

$$\sqrt{G_v} = \frac{k}{\sqrt{L_v}\left(1 + \sqrt{\frac{L_h}{L_v}}\right)} \quad (2)$$

In the case of an independent AGC operation for the V- and H-polarized wave receiving sides, equation (3) is established:

$$k = \sqrt{L_v G} \quad (3)$$

where the character G denotes the gain of the amplifier operated under the independent AGC operation.

The noise levels are as follows. A noise level P$_n$, at each of the portions (1) and (2) in FIG. 6, is expressed as $$P_n = KTBG \quad (4)$$

where the character K denotes Boltzmann's constant, T an absolute temperature, and B a frequency band. A noise level P$_N$ at the portion (3) in FIG. 6 is expressed as follows:

$$P_N = \frac{P_n}{\left(1 + \sqrt{\frac{L_h}{L_v}}\right)^2} \times 2 \quad (5)$$

Accordingly, the signal-to-noise (S/N ratio, i.e., S/P$_N$ is given as $$S/N = \frac{S}{P_n} \times \frac{\left(1 + \sqrt{\frac{L_h}{L_v}}\right)^2}{2} \quad (6)$$

where S/P$_n$ is defined as an S/N ratio exhibited under the independent AGC operation. If L$_h$=L$_v$ is satisfied, equation (7) is obtained:

$$S/N = \frac{S}{P_n} \times 2 \quad (7)$$

This means that the S/N ratio under the common AGC operation is improved by about 3 dB.

The thus AGC'ed received signal is then applied, via the differential amplifier 129, to the discriminator 130, by which the digital data is reproduced. In the discriminator 130, if the threshold level (corresponding to the chain dotted line at the center of FIG. 2B) is fixed, there is the possibility of a larger error rate. This is caused by the fact that the received amplitude levels of both the V- and H-polarized wave signals are not maintained equal to each other at any time. For example, if the signal is received inside a room, the directly received signal or the reflected received signal is often drastically reduced in level due to a phase deviation therebetween. This necessarily results in discrimination error of the data "1" and "0".

Figure 7:
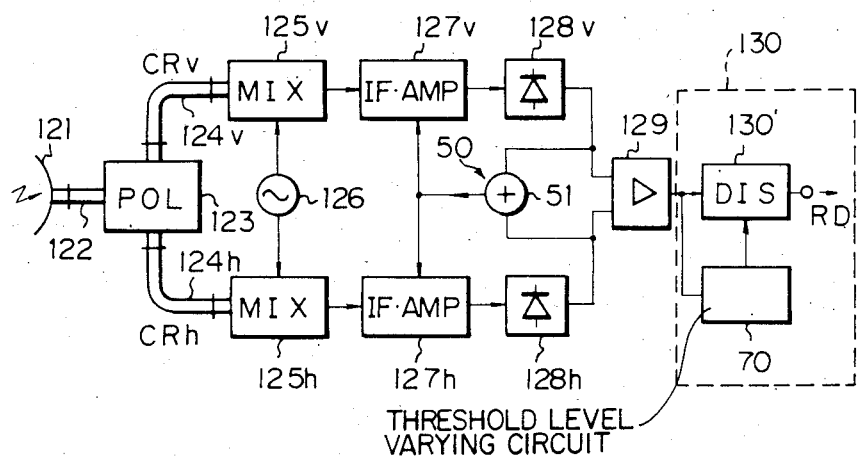
FIG. 7 illustrates a modification for improvement of the receiver unit illustrated in FIG. 5A.

Such discrimination error can be minimized with the use of a particular circuit, explained as follows. FIG. 7 illustrates a modification for improvement of the receiver unit in FIG. 5A. The difference is that a threshold level varying discriminator 130 (TLV) 70 is added to the circuit in FIG. 5A. The TLV 70 supplies a variable threshold level to a discriminating portion 130' of the discriminator 130.

Figure 8:
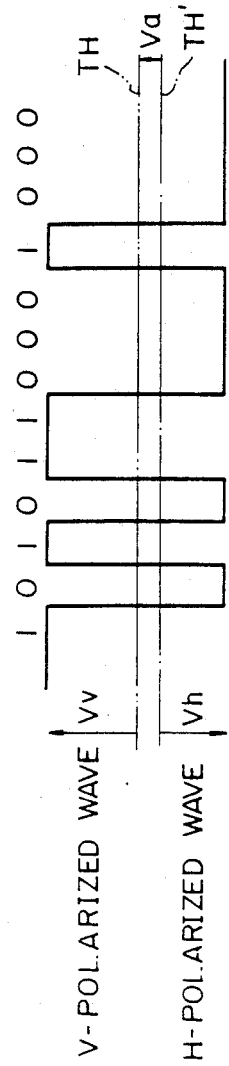
FIG. 8 depicts waveforms of the receiving signal, for explaining the role of the threshold level varying circuit illustrated in FIG. 7.

FIG. 8 depicts waveforms of the received signal for explaining the role of the threshold level varying circuit 70 in FIG. 7. The waveforms correspond to those of FIG. 2B. In FIG. 8, if the threshold level is fixed at a level indicated by a chain dotted line TH', the discrimination margin for the H-polarized wave received signal would be smaller when the output of the differential amplifier 129 is produced with an imbalance between the V-polarized wave signal level V$_v$ and the H-polarized wave signal level V$_h$ favoring V$_v$ as illustrated. For this, a level $$V_a \left( = \frac{V_v + V_h}{2} \right)$$

is added to the fixed threshold level TH' to obtain a variable threshold level TH. Thereby, an optimum threshold level, i.e., a center or average level between peak-to-peak levels of $V_v$ and $V_h$, can always be maintained. This is the role of the circuit 70.

Figure 9:
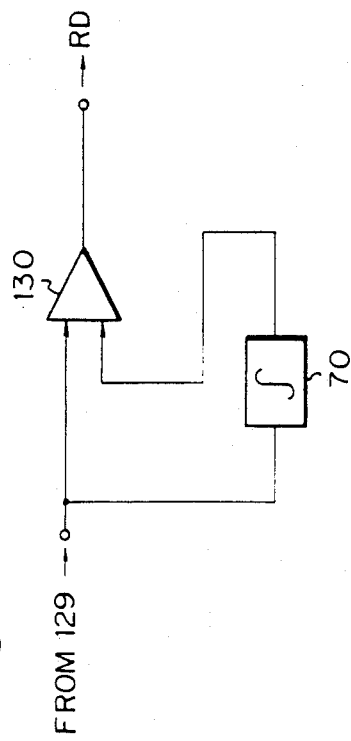
FIG. 9 illustrates an example of the discriminator and threshold level varying circuit in FIG. 7.

FIG. 9 illustrates an example of the discriminator 130 and the threshold level varying circuit 70 in FIG. 7. In FIG. 9, the discriminator 130 is constructed in the form of a comparator which receives, at its first input, the output from the differential amplifier 129 and, at its second input, the output from the circuit 70 constructed in the form of an integrator. The integrator 70 includes, first, sample and hold capacitors performing individual sample and holding operations for the V- and H-polarized wave received signals and, second, a smoothing capacitor to produce the mean voltage $V_a$ between the terminal voltages produced by the two sample and hold capacitors.

Figure 10A:
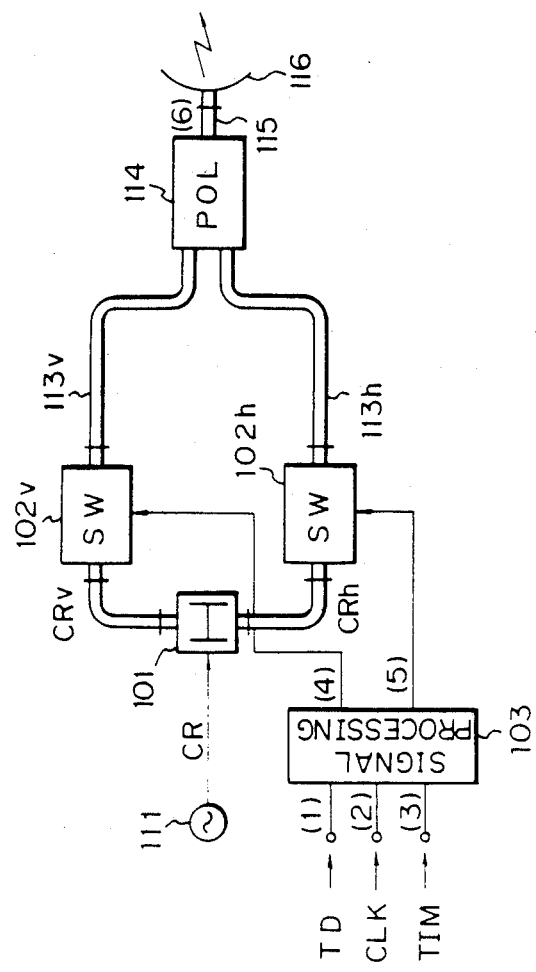
FIG. 10A illustrates a transmitter unit of the system according to the present invention, in which burst-like data transmission is performed.
Figure 10B:
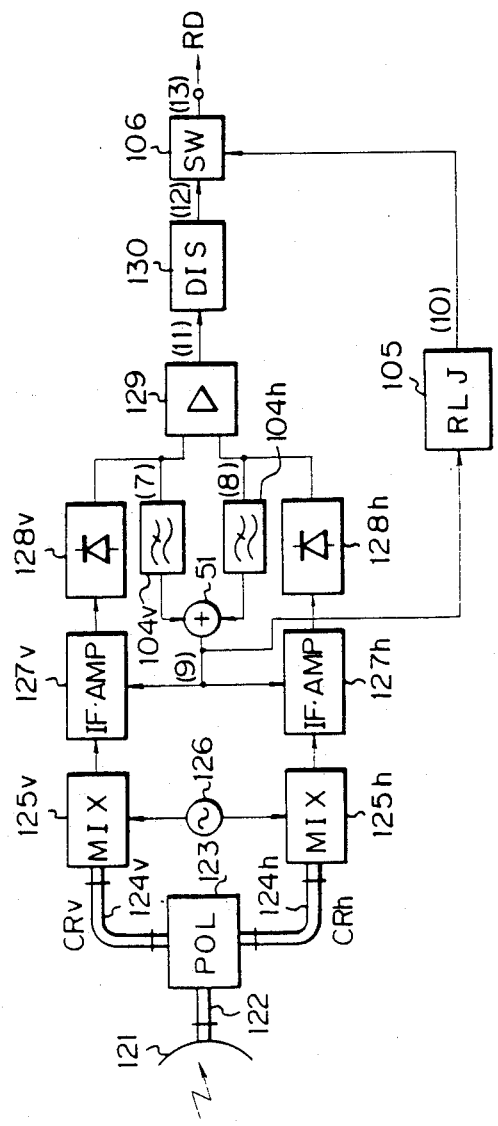
FIG. 10B illustrates a receiver unit to be coupled with the transmitter unit illustrated in FIG. 10A.

As mentioned previously, the system of the present invention can be adapted to burst-like data transmission too, even though the system is operated under the on-off keying type ASK modulation method. FIG. 10A illustrates a transmitter unit of the system according to the present invention, in which burst-like data transmission is performed. FIG. 10B illustrates a receiver unit to be coupled with the transmitter unit illustrated in FIG. 10A. Here, "burst-like data transmission" means the equivalent of, for example, the term "TDMA method".

According to the TDMA method, each data transmission commences irregularly or discontinuously. Accordingly, the receiver unit (FIG. 10B) must be activated only when data transmission occurs and must not reproduce undesired received data outside of the data transmission period. Further, the receiver unit is required to start the AGC as quickly as possible, since, as mentioned above, the data transmission commences irregularly. In other words, the receiver unit does not know when the transmission data will be supplied from the transmitter unit. Thus, the initial activation is important in the receiver unit in order to stabilize the AGC very quickly.

FIG. 10C depicts waveforms of major signals appearing in the transmitter unit of FIG. 10A and the receiver unit of FIG. 10B for explaining the operations thereof. It should be noted that the waveforms of rows (1) through (13) represent signals appearing at respective portions labelled (1) through (13) in FIGS. 10A and 10B.

Reference numeral 101 in FIG. 10A represents a hybrid circuit for branching the carrier CR evenly into the waveguide $113_v$ and $113_h$. The evenly branched carriers $CR_v$ and $CR_h$ are controlled for the data transmission at switches $102_v$ and $102_h$. The switches $102_v$ and $102_h$ are made of, for example, so-called tri-state switches, the three states corresponds to switch $102_v$ being ON in the first and OFF in the second and third, while switch $102_h$ is ON in the second and OFF in the first and third states. The control operation for these three states can be achieved by means of a known signal processing circuit 103. The circuit 103 receives the transmission data TD (row (1)) in FIG. 10C, a clock signal CLK (row (2)) and a timing signal TIM (row (3)) which is specifically a TDMA timing signal. The circuit 103 is, in other words, a speed conversion circuit and produces, at its outputs, burst signals, as depicted in rows (4) and (5). The shaded portions (right to left diagonals) of the concerned waveforms, i.e., $S_v$ and $S_h$, are particularly important to note. The shaded portions indicate the lead burst signals $S_v$ and $S_h$, which play an important role in the present invention. That is, the lead burst signals $S_v$ and $S_h$ are used for establishing initial activation of AGC in the receiver.

The switches $102_v$ and $102_h$ are turned on and off in accordance with digital data of logic "1" and "0" to allow the carriers $CR_v$ and $CR_h$ to pass therethrough, respectively, to reach the antenna 116 (refer to row (6)). When the data transmission is not performed, the switches $102_v$ and $102_h$ are both turned off (the third state).

The transmission data enters, via the antenna 121, the receiver unit. Thereafter, the received data appears at the outputs of the detectors $128_v$ and $128_h$ with the waveforms in rows (7) and (8), respectively. In rows (7) and (8), the shaded portions (left to right diagonals) N indicate noise signals.

The outputs (7) and (8) are applied, after elimination of the noise N therefrom by the low-pass filters $104_v$ and $104_h$, to the adder 51. The output of the adder 51 has the waveform of row (9). The output (9), i.e., the AGC signal, quickly rises in a time t of row (9) and then exceeds a threshold level TH" for judging the received amplitude level. In this case, the signal rise in the time t is performed by using the lead burst signals $S_v$ and $S_h$. The inherent received signal is not output until the AGC is established completely. The threshold level TH" for judging the received amplitude level is determined by a received level judging circuit (RLJ) 105 to produce therefrom a resultant output (10) in response to the output (9) from the adder 51. It should be understood that, in FIG. 10C, the pulse width of the resultant output (row 10)) is equal to the length of time T in which the AGC signal (row (9)) exceeds the level TH".

The time T also indicates the time during which the transmission data TD is received. Therefore, the output (10) in the time T is applied to an on/off switch (SW) 106 of FIG. 10B. The switch 106 is turned on so long as the output (10) exists, to produce therefrom the necessary received data RD. Further, the output (11) from the differential amplifier 129 and the output (12) from the discriminator 130 appear with the waveforms depicted in the respective rows (11) and (12). Although the outputs (11) and (12) contain undesired noise signals N, the signals N cause no trouble, because they are finally cancelled by the on/of switch 106.

Figure 10D:
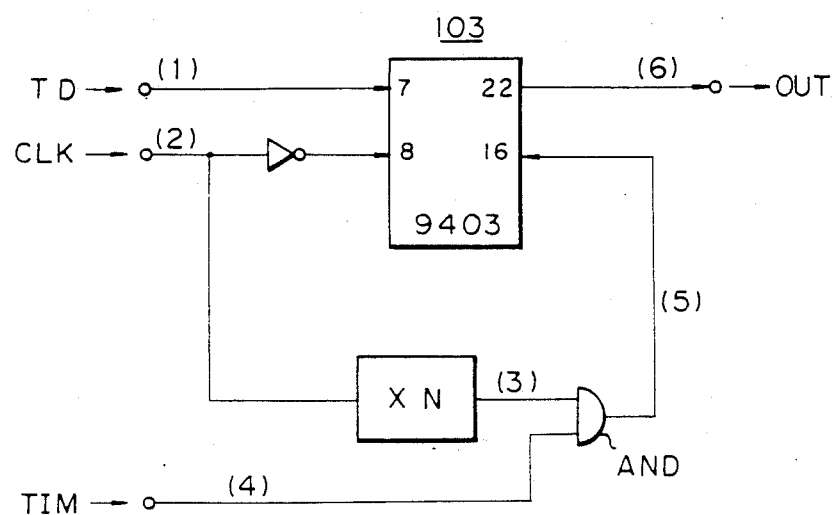
FIG. 10D illustrates a more detailed example of the signal processing circuit illustrated in FIG. 10A.

FIG. 10D illustrates a more detailed example of the signal processing circuit 103 illustrated in FIG. 10A. The example corresponds to IC 9403 of Fairchild Industries, Inc. The operation of the circuit 103 will be clarified with reference to FIG. 10E. FIG. 10E depicts waveforms of major signals appearing in the circuit 103 of FIG. 10D. The waveforms of rows (1) through (6) correspond to signals appearing at portions (1) through (6) in FIG. 10D. In FIG. 10D, a block labelled with characters XN operates to multiply the input clock signal CLK by N. The waveform of row (3) is an example of a case where the clock signal CLK is multiplied by 4 (N=4). The output OUT (6) of FIG. 10D corresponds to the waveform (4) in FIG. 10C, while the output OUT (6) is inverted by an inverter (not shown) for the waveform (5) in FIG. 10C.

Figure 11:
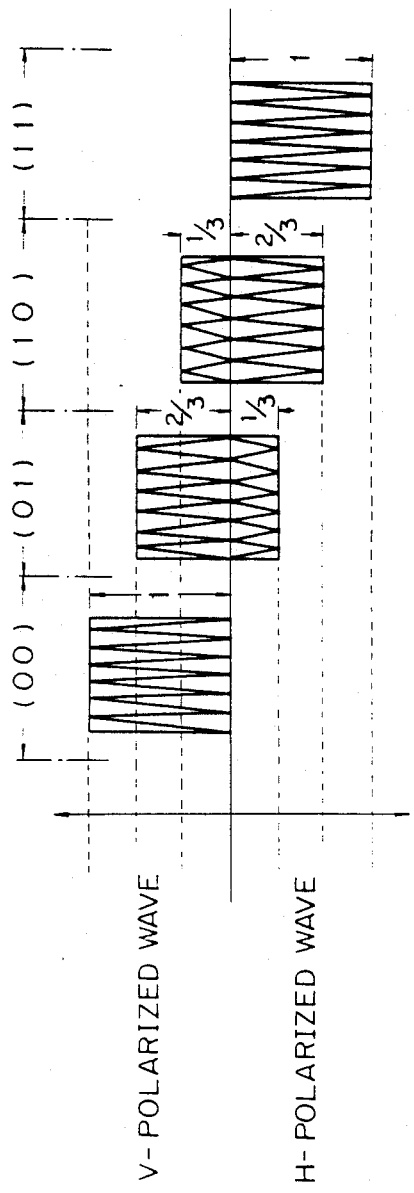
FIG. 11 depicts waveforms of the transmission signal for explaining the principle operation of a radio communication system according to a second embodiment of the present invention.

Next, a radio communication system according to a second embodiment will be described. The system of the second embodiment is operated under the multilevel amplitude keying type ASK modulation method, instead of the on-off keying type ASK used in the first embodiment. FIG. 11 depicts waveforms of the transmission signal for explaining the principle operation of the radio communication system according to the second embodiment of the present invention. As can be seen in FIG. 11, the V- and H-polarized waves of the transmission signal have multiple amplitude levels. In FIG. 11, four combinations of such levels are depicted. Therefore, data patterns of (00), (01), (10), and (11) may be allotted for the combinations depicted. This means that the data transmission capacity can be increased approximately twice over the data transmission capacity of the first embodiment, as can easily be recognized by comparing the data transmission modes of FIG. 2B and FIG. 11. To achieve this increase, however, it is necessary to partially modify the system according to the first embodiment.

Figure 12A:
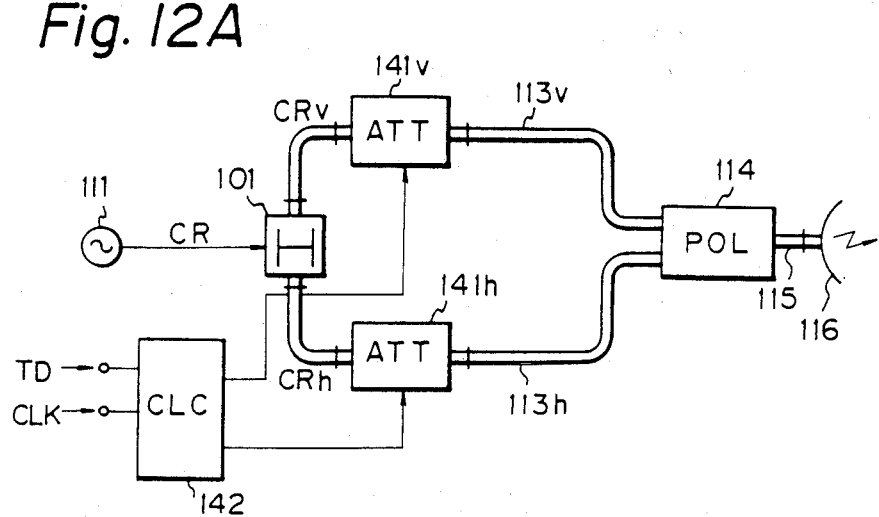
FIG. 12A illustrates a transmitter unit of the radio communication system according to the second embodiment of the present invention.

FIG. 12A illustrates a transmitter unit of the radio communication system according to the second embodiment of the present invention. Reference numerals and characters the same as in previous figures represent the same elements (same for later figures). In FIG. 12A, variable attenuators (ATT) $141_v$ and $141_h$ are employed in place of the switches $102_v$ and $102_h$ in FIG. 10A. The attenuators $141_v$ and $141_h$ attenuate the individual carriers $CR_v$ and $CR_h$ passing therethrough according to attenuation factors supplied from a carrier level controller (CLC) 142 to create individual multilevel modes, such as those in FIG. 11.

Figure 12B:
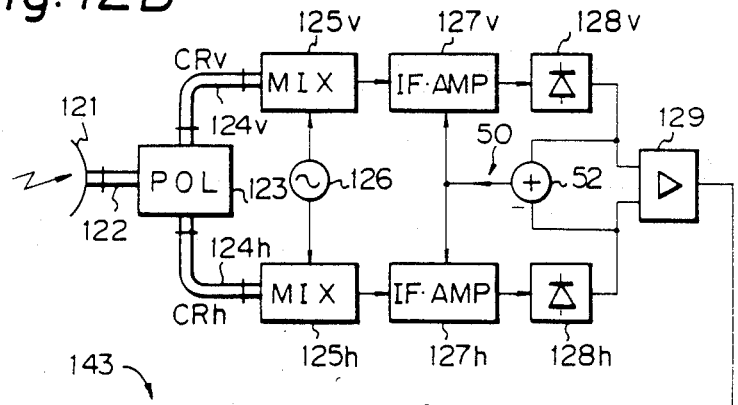
FIG. 12B illustrates a receiver unit of the radio communication system according to the second embodiment of the present invention.
Figure 12B:
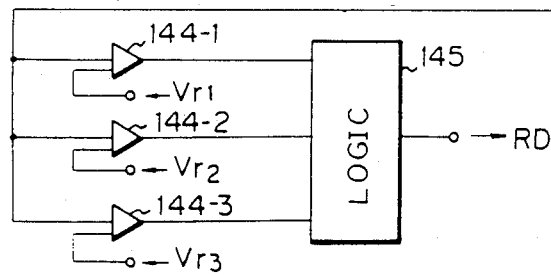

FIG. 12B illustrates a receiver unit of the radio communication system according to the second embodiment of the present invention. The arrangement of FIG. 12B is similar to that of FIG. 5A. The only differences are that a discriminator 143 and a logic circuit 145 are used, instead of the discriminator 130 in FIG. 5A. Also, an adder 52 having an inverting input (−) is used, instead of the adder 51 in FIG. 5A. It should be understood that the circuit of FIG. 12B would be used in a system in which the four multilevel modes of FIG. 11 are selectively formed.

The differential amplifier 129 of FIG. 12B produces outputs with four different levels: $+1$, $+\frac{1}{3}$ ($=\frac{2}{3}-\frac{1}{3}$), $-\frac{1}{3}$ ($=-\frac{2}{3}+\frac{1}{3}$) and $-1$, relative to each other, according to the received amplitude levels of the V- and H-polarized waves based on the multilevel modes depicted in FIG. 11. These outputs can be distinguished from each other by comparators 144-1, 144-2 and 144-3, which have individual reference voltages $V_{r1}$, $V_{r2}$ and $V_{r3}$. The level of $V_{r1}$ is preset between the levels of the above-mentioned $+1$ and $+\frac{1}{3}$. Similarly, $V_{r2}$ is preset between $+\frac{1}{3}$ and $-\frac{1}{3}$, and $V_{r3}$ between $-\frac{1}{3}$ and $-1$. When the comparators 144-1, 144-2 and 144-3 produce the logic values "1", "1", and "1", respectively, the logic circuit 145 determines that the received data is (00). Similarly, if the produced logic values are (011), (001) and (000), the received data are determined by the logic circuit 145 as (01), (10) and (11), respectively. Therefore, the logic circuit 145 can be fabricated as a simple decoding circuit.

Regarding the common AGC circuit 50 of FIG. 12B, it has the adder 52 provided with the inverting input (−) for the H-polarized wave received signal. Since the H-polarized wave receiving signal is inverted in polarity, the adder 52 produces a constant level of $+1$ at any multilevel mode of FIG. 11. That is, the added levels are expressed as $(+1-0)$, $\{+\frac{2}{3}-(-\frac{1}{3})\}$, $\{+\frac{1}{3}-(-\frac{2}{3})\}$, and $\{0-(-1)\}$, all resulting in $+1$, in response to the four multilevel modes.

Figure 13:
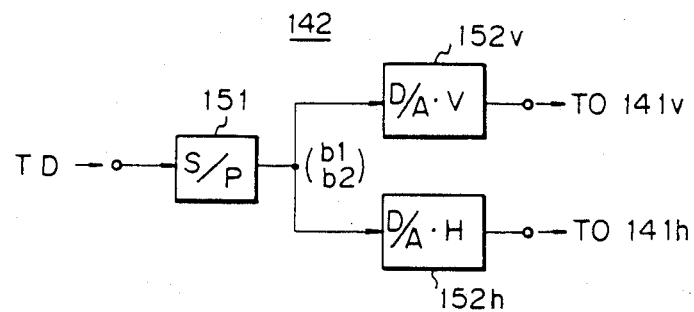
FIG. 13 is a circuit diagram of an example of the carrier level controller in FIG. 12A.

FIG. 13 is a circuit diagram of an example of the carrier level controller 142 in FIG. 12A. The serial transmission data TD is sequentially input to a serial/parallel converter (S/P) 151 to obtain two parallel bits (b1, b2) which can form the data (00), (01), (10) and (11) in FIG. 11 in accordance with the logic values of data TD. Then, the converted parallel logic bits are supplied to both the V-polarized wave digital/analog converter (D/A V) $152_v$ and H-polarized wave digital/analog converter (D/A H) $152_h$. The outputs from the D/A converters $152_v$ and $152_h$ are supplied, as attenuation factors, to individual variable attenuators $141_v$ and $141_h$, respectively, of FIG. 12A. The converters (D/A V) $152_v$ and (D/A H) $152_h$ are designed to produce relative analog levels, i.e., the attenuation factors, recited in the following Table A, in response to the data logic bits (b1, b2) of FIG. 11.

TABLE A

| b1 | 0 | 0 | 1 | 1 |
|---|---|---|---|---|
| b2 | 0 | 1 | 0 | 1 |
| D/A V | 1 | ⅔ | ⅓ | 0 |
| D/A H | 0 | ⅓ | ⅔ | 1 |

Figure 14:
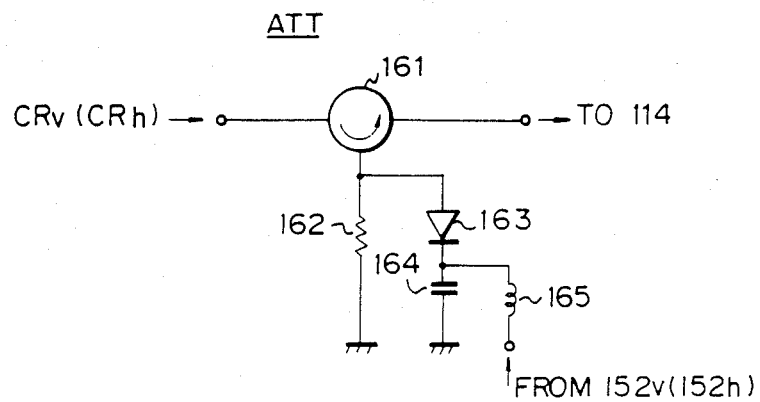
FIG. 14 is a circuit diagram of an example of each of the variable attenuators in FIG. 12A.

FIG. 14 is a circuit diagram of an example of one of the variable attenuators (ATT) $41_v$ and $41_h$ in FIG. 12A. The attenuator ATT is comprised of an isolator 161, a resistor 162, a pin diode 163, a capacitor 164 and a coil 165. The resistor 162 words as a termination resistor. In accordance with the variety of analog levels (attenuation factors), the pin diode 163 is put in an opened state (1), a shorted state (0), or an intermediate state (⅓ and ⅔) therebetween.

Figure 15:
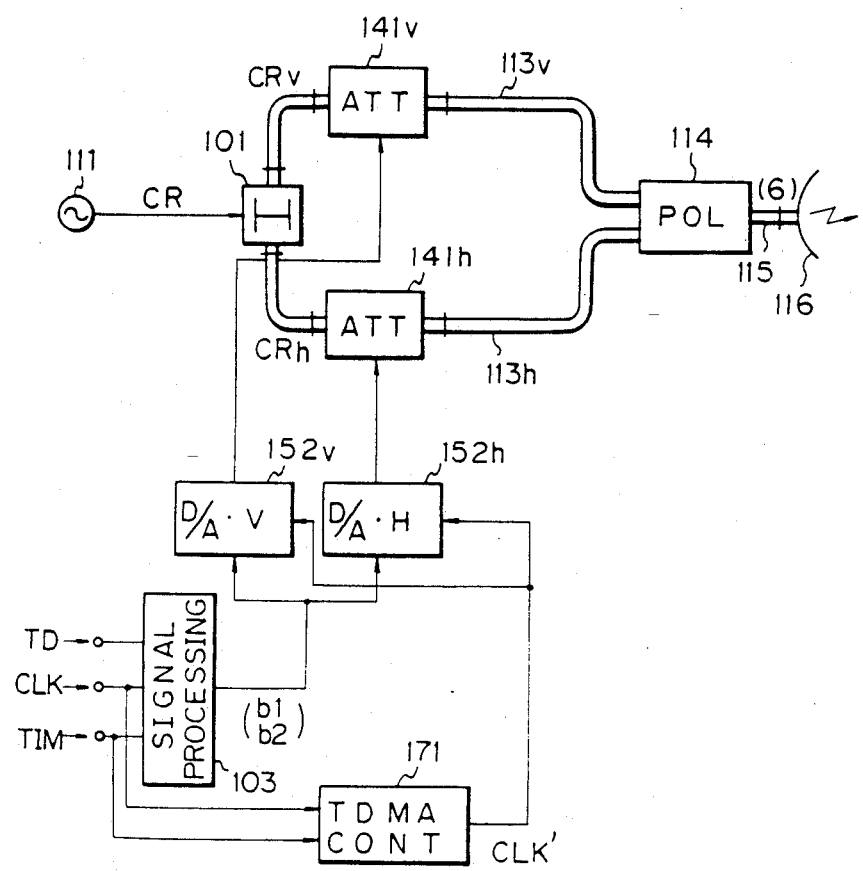
FIG. 15 illustrates a modification of the transmitter unit in FIG. 10A.

FIG. 15 illustrates a modification of the transmitter unit in FIG. 10A. The modification couples the signal processing circuit 103 (FIG. 10A) with a part of the carrier level controller 142 (FIG. 13). The D/A converters $152_v$ and $152_h$ are clocked by a control clock signal CLK' produced from a TDMA controller 171 receiving both the clock signal CLK and the TDMA timing signal TIM.

Figure 16:
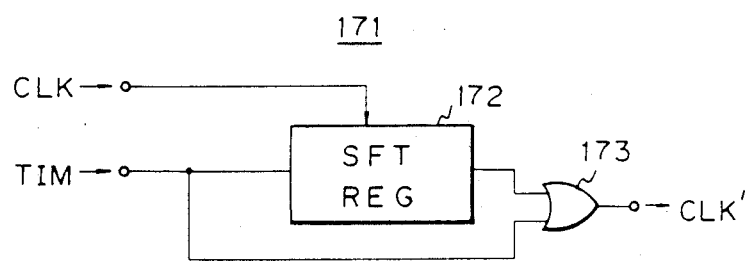
FIG. 16 is a circuit diagram of an example of the TDMA controller in FIG. 15.

FIG. 16 is a circuit diagram of an example of the TDMA controller 171 in FIG. 15. In FIG. 16, the TDMA controller 171 is comprised of a shift register 172 synchronized with the clock signal CLK and receiving the timing signal TIM. The shifted output and the signal TIM itself are OR'ed by an OR gate 173 to produce the control clock signal CLK'. The signal CLK' restricts the duration in which the signal of row (6) in FIG. 10C is to be supplied. In this case, the converters $152_v$ and $152_h$ are designed to produce the relative analog level, i.e., the attenuation factors, recited in Table B in response to the data logic bits (b1, b2) and the TDMA timing signal TIM.

TABLE B

| TIM | 1 | 1 | 1 | 1 | 0 | 0 | 0 | 0 |
|---|---|---|---|---|---|---|---|---|
| b1 | 0 | 0 | 1 | 1 | 0 | 0 | 1 | 1 |
| b2 | 0 | 1 | 0 | 0 | 1 | 1 | 1 | 0 |
| D/A V | 1 | ⅔ | ⅓ | 0 | 0 | 0 | 0 | 0 |
| D/A H | 0 | ⅓ | ⅔ | 1 | 0 | 0 | 0 | 0 |

In the second embodiment, the threshold level varying circuit 70 is preferably associated with the discriminator 143 (FIG. 12B), as in the first embodiment. That is, the reference voltages $V_{r1}$, $V_{r2}$ and $V_{r3}$ of FIG. 12B are preferably shifted in level along with the variation of the output level of the adder 52 in FIG. 12B.

We claim:

1. A radio communication system for transmitting and receiving digital data over a transmission path using an on-off amplitude shift keying modulation method, said system comprising:

a transmitter unit, operatively coupled to the transmission path, for generating a carrier, transforming the carrier into a vertically (V)-polarized wave carrier and a horizontally (H)-polarized wave carrier in dependence upon the digital data and transmitting at least one of the V-polarized wave carrier and the H-polarized wave carrier as a transmission signal, over the transmission path when the digital data is to be transmitted; and a receiver unit, operatively coupled to the transmission path to receive the transmission signal for separating the transmission signal of the V-polarized wave carrier and the H-polarized wave carrier into V- and H-polarized wave received signals, detecting the amplitude levels of the V- and H-polarized received signals and reproducing the digital data as received data in dependence upon existence or nonexistence of the V- and H-polarized wave received signals, comprising:

a V-polarized wave mixer, operatively coupled to the transmission path, for demodulating the V-polarized wave received signal;

a V-polarized wave intermediate frequency amplifier operatively connected to said V-polarized wave mixer;

a V-polarized wave detector, operatively connected to said V-polarized wave intermediate frequency amplifier, for detecting the V-polarized wave received signal;

an H-polarized wave mixer, operatively coupled to the transmission path, for demodulating the H-polarized wave received signal;

an H-polarized wave intermediate frequency amplifier operatively connected to said H-polarized wave mixer;

an H-polarized wave detector, operatively connected to said H-polarized wave intermediate frequency amplifier, for detecting the H-polarized wave received signal;

a local oscillator, operatively connected to said V- and H-polarized wave mixers, supplying a local oscillation signal commonly to both said V- and H-polarized wave mixers to produce individual intermediate frequency signals;

a differential amplifier, operatively connected to said V- and H-polarized wave detectors, for amplifying a difference between the V- and H-polarized wave received signals; and a discriminator, operatively connected to said differential amplifier, for reproducing the digital data.

2. A system as set forth in claim 1, wherein said transmitter unit comprises switching means, operatively coupled to the transmission path to receive the carrier and the digital data, for producing one of the V- and H-polarized wave carriers in dependence upon the digital data.

3. A system as set forth in claim 2, wherein said switching means comprises a polarized wave switching selector, operatively coupled to the transmission path, controlled by the digital data.

4. A system as set forth in claim 2, wherein said switching means comprises:

a V-polarized wave switch operatively coupled to the transmission path; and an H-polarized wave switch, operatively coupled to the transmission path, installed independently from said V-polarized wave switch.

5. A system as set forth in claim 1, wherein the V- and H-polarized wave received signals have amplitude levels and said receiver unit further comprises a common automatic gain control circuit, operatively connected to said V- and H-polarized wave intermediate frequency amplifiers and said V- and H-polarized wave detectors, for controlling the gain of said V- and H-polarized wave intermediate frequency amplifiers in dependence upon the amplitude levels of both the V- and H-polarized wave received signals.

6. A system as set forth in claim 5, wherein the V- and H-polarized wave received signals have amplitudes with absolute values and said common automatic gain control circuit comprises an adder, operatively connected to said V- and H-polarized wave intermediate frequency amplifiers and said V- and H-polarized wave detectors, for adding the absolute value of the amplitude of the V- and H-polarized wave received signals to produce an added output and supplying the added output to both said V- and H-intermediate frequency amplifiers, simultaneously.

7. A system as set forth in claim 6 and receiving a reference bias voltage, wherein said adder comprises:

a V-polarized wave low-pass filter operatively connected to said V-polarized wave detector and having an output;

an H-polarized wave low-pass filter operatively connected to said H-polarized wave detector and having an output;

a hybrid circuit, operatively connected to said V- and H-polarized wave low-pass filters, for adding the outputs from said V- and H-polarized wave low-pass;

a combined output low-pass filter operatively connected to said hybrid circuit; and a comparator having a first input operatively connected to said combined output low-pass filter and a second input operatively connected to receive the reference bias voltage and producing a resultant output for controlling both said V-and H-polarized wave intermediate frequency amplifiers.

8. A system as set forth in claim 5, wherein said differential amplifier has an output and said discriminator generates a threshold level voltage to distinguish a logic "1" from a logic "0" in the output from said differential amplifier.

9. A system as set forth in claim 8, wherein said discriminator comprises a threshold level varying circuit, operatively connected to said differential amplifier for varying the threshold level voltage in dependence upon the output from said differential amplifier.

10. A system as set forth in claim 5,
wherein said transmitter unit transmits the transmission signal in random bursts and the transmission signal includes a lead burst signal in advance of the digital data in each of the random bursts, and wherein said automatic gain control circuit is initially activated using the lead burst signal.

11. A system as set forth in claim 10, wherein said receiver unit further comprises:

an on/off switch, operatively connected to said discriminator, for controlling passage of the received data; and a received level determining circuit, operatively connected to said common automatic gain control circuit and said on/off switch, for controlling said on/off switch in dependence upon the lead burst signal as output by said common automatic gain control circuit.

12. A radio communication system for transmitting and receiving digital data over a transmission path, using a multilevel keying type amplitude shift keying modulation method, said system comprising:
  a transmitter unit operatively coupled to the transmission path, for generating a carrier, transforming the carrier to V- and H-polarized wave carriers at any one of predetermined multilevel amplitudes in dependence upon the digital data, the sum of the amplitudes of the V- and H-polarized wave carriers being substantially constant during data transmission, and transmitting at least one of the V- and H-polarized wave carriers over the transmission path as a trasmission signal when the digital data is to be transmitted; and
  a receiver unit, operatively coupled to the transmission path to receive the transmission signal for separating the transmission signal, of the V-polarized wave carrier and the H-polarized wave carrier into V- and H-polarized wave received signals, detecting the amplitude levels of the V- and H-polarized received signals and reproducing the digital data as received data according to a variety of combinations of the multilevel amplitudes of the V- and H-polarized wave received signals, comprising:
    a V-polarized wave mixer, operatively coupled to the transmission path, for demodulating the V-polarized wave received signal;
    a V-polarized wave intermediate frequency amplifier operatively connected to said V-polarized wave mixer;
    a V-polarized wave detector, operatively connected to said V-polarized wave intermediate frequency amplifier, for detecting the V-polarized wave received signal;
    an H-polarized wave mixer, operatively coupled to the transmission path, for demodulating the H-polarized wave received signal;
    an H-polarized wave intermediate frequency amplifier operatively connected to said H-polarized wave mixer;
    an H-polarized wave detector, operatively connected to said H-polarized wave intermediate frequency amplifier, for detecting the H-polarized wave received signal;
    a local oscillator, operatively connected to said V- and H-polarized wave mixers, supplying a local oscillation signal commonly to both said V- and H-polarized wave mixers to produce individual intermediate frequency signals;
    a differential amplifier, operatively connected to said V- and H-polarized wave detectors, for amplifying a difference between the V- and H-polarized wave received signals; and
    a discriminator, operatively connected to said differential amplifier, for reproducing the digital data.

13. A system as set forth in claim 12, wherein said transmitter unit comprises carrier level varying means, operatively connected to receive the carrier and the digital data, for producing the V- and H-polarized wave carriers having individual amplitude levels in dependence upon the digital data.

14. A system set forth in claim 13, wherein said carrier level varying means comprises:
  a V-polarized wave variable attenuator, operatively connected to receive the carrier and the digital data, for attenuating the amplitude level of the V-polarized wave carrier; and
  an H-polarized wave variable attenuator, operatively connected to receive the carrier and the digital data, for attenuating the amplitude level of the H-polarized wave carrier.

15. A system as set forth in claim 14, wherein said carrier level varying means further comprises a carrier level controller, operatively connected to said V- and H-polarized wave variable attenuators and to receive the digital data, for outputting individual attenuation factors which control said V- and H-polarized wave variable attenuators.

16. A system as set forth in claim 15, wherein said carrier level controller comprises:
  a serial/parallel converter, operatively connected to receive the digital data, for converting serial bits of the digital data sequentially into parallel bits as a logic set; and
  V- and H-polarized wave digital/analog converters, operatively connected to said V- and H-polarized wave variable attenuators, respectively, and said serial/parallel converter, for producing analog level signals as the individual attenuation factors in dependence upon the logic set.

17. A system as set forth in claim 12, wherein the V- and H-polarized wave received signals have amplitude levels and said receiver unit further comprises a common automatic gain control circuit, operatively connected to said V- and H-polarized wave intermediate frequency amplifiers and said V- and H-polarized wave detectors, for controlling the gain of said V- and H-polarized wave intermediate frequency amplifiers in dependence upon the amplitude levels of both the V- and H-polarized wave received signals.

18. A system as set forth in claim 17, wherein the V- and H-polarized wave received signals have amplitudes with absolute values and said common automatic gain control circuit comprises an adder, operatively connected to said V- and H-polarized wave intermediate frequency amplifiers and said V- and H-polarized wave detectors, for adding the absolute value of the amplitudes of the V- and H-polarized wave received signals to produce an added output and supplying the added output to both said V- and H-intermediate frequency amplifiers, simultaneously.

19. A system as set forth in claim 18 and receiving a reference bias voltage, wherein said adder comprises:
  a V-polarized wave low-pass filter operatively connected to said V-polarized wave detector and having an output;
  an H-polarized wave low-pass filter operatively connected to said H-polarized wave detector and having an output;
  a hybrid circuit, operatively connected to said V- and H-polarized wave low-pass filters, for adding the outputs from said V- and H-polarized wave low-pass filters;
  a combined output low-pass filter operatively connected to said hybrid circuit; and
  a comparator having a first input operatively connected to said combined output low-pass filter and a second input operatively connected to receive the reference bias voltage and producing a resultant output for controlling both said V- and H-polarized wave intermediate frequency amplifiers.

20. A system as set forth in claim 17, wherein said differential amplifier has an output and said discriminator generates a plurality of reference voltages for determining a logic set from the output of said differential amplifier.

21. A system as set forth in claim 20, wherein said discriminator comprises:
    a plurality of comparators, each having a first input operatively connected to the output of said differential amplifier and a second input operatively connected to receive one of the reference voltages and an output; and
    a logic circuit operatively connected to the output of each of said comparators for determining the logic set as the receiving data.

22. A system as set forth in claim 21, wherein said logic circuit comprises a decoder operatively connected to said comparators.

23. A system as set forth in claim 20, wherein said discriminator comprises a threshold level varying circuit, operatively connected to said differential amplifier for varying the reference voltages in dependence upon the output from said differential amplifier.

24. A system as set forth in claim 17,
    wherein said transmitter unit transmits the transmission signal in random bursts and the transmission signal includes a lead burst signal in advance of the digital data in each of the random bursts, and
    wherein said automatic gain control circuit is initially activated using the lead burst signal.

25. A system as set forth in claim 24, wherein said receiver unit further comprises:
    an on/off switch, operatively connected to said discriminator, for controlling passage of the received data; and
    a received level determining circuit, operatively connected to said common automatic gain control circuit and said on/off switch, for controlling said on/off switch in dependence upon the lead burst signal as output by said common automatic gain control circuit.

* * * * *

UNITED STATES PATENT AND TRADEMARK OFFICE
CERTIFICATE OF CORRECTION

PATENT NO.  : 4,658,405
DATED       : April 14, 1987
INVENTOR(S) : Yazuka et al.

It is certified that error appears in the above-identified patent and that said Letters Patent is hereby corrected as shown below:

```
Column 4,  line 20, "18." should be --1B.--.
Column 6,  line 49, "discriminator 130" should be --circuit--;
           line 50, "circuit" should be --discriminator 130--.
Column 8,  line 46, "on/of" should be --on/off--.
Column 10, line 27, "words" should be --works--;
           line 56, "0" (third occurrence) should be --1--.
Column 12, line 36, "pass;" should be --pass filters;--.
Column 13, line 18, "trasmission" should be --transmission--.
```

Signed and Sealed this

Twenty-second Day of September, 1987

*Attest:*

DONALD J. QUIGG

*Attesting Officer*  *Commissioner of Patents and Trademarks*